US007761783B2

(12) United States Patent
Lahman et al.

(10) Patent No.: US 7,761,783 B2
(45) Date of Patent: Jul. 20, 2010

(54) DOCUMENT PERFORMANCE ANALYSIS

(75) Inventors: Aaron Lahman, Redmond, WA (US); Bao Nguyen, Redmond, WA (US); Feng Yuan, Bellevue, WA (US); Mariyan D. Fransazov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 792 days.

(21) Appl. No.: 11/624,897

(22) Filed: Jan. 19, 2007

(65) Prior Publication Data

US 2008/0178067 A1 Jul. 24, 2008

(51) Int. Cl.
*G06F 17/00* (2006.01)

(52) U.S. Cl. ...................................... 715/234; 715/255

(58) Field of Classification Search ................. 715/234, 715/255, 243, 273
See application file for complete search history.

(56) References Cited

U.S. PATENT DOCUMENTS 5,175,633 A * 12/1992 Saito et al. .................. 358/406
5,812,122 A 9/1998 Ng
5,973,693 A * 10/1999 Light ......................... 715/835
6,665,425 B1 * 12/2003 Sampath et al. ............. 382/112
6,694,053 B1 2/2004 Burns et al.
7,036,076 B2 * 4/2006 Anwar ........................ 715/255
7,356,764 B2 * 4/2008 Radja et al. ................. 715/234
2003/0018666 A1 1/2003 Chen et al.
2003/0145279 A1 * 7/2003 Bourbakis et al. ........... 715/511
2003/0163788 A1 8/2003 Dougherty
2004/0034834 A1 2/2004 Pirie et al.
2005/0021851 A1 * 1/2005 Hamynen ................... 709/245
2005/0055632 A1 * 3/2005 Schwartz et al. ............ 715/513
2005/0091576 A1 * 4/2005 Relyea et al. ............... 715/502
2005/0097458 A1 * 5/2005 Wilson ....................... 715/517
2005/0216493 A1 9/2005 Fujita
2005/0289138 A1 12/2005 Cheng et al.
2005/0289182 A1 * 12/2005 Pandian et al. ........... 707/104.1
2005/0289446 A1 * 12/2005 Moncsko et al. ......... 715/501.1
2006/0155751 A1 * 7/2006 Geshwind et al. ........... 707/102
2006/0161559 A1 7/2006 Bordawekar et al.
2006/0288015 A1 * 12/2006 Schirripa et al. ............ 707/100
2007/0089053 A1 * 4/2007 Uhlig et al. ................. 715/513
2007/0165260 A1 * 7/2007 Fransazov .................. 358/1.13
2007/0165267 A1 * 7/2007 Fransazov .................. 358/1.15
2007/0174710 A1 * 7/2007 Duan et al. .................... 714/38
2007/0186152 A1 * 8/2007 Gurcan et al. ............... 715/509

(Continued)

OTHER PUBLICATIONS

Gancarski, et al., "Interactive Information Retrieval from XML Documents Represented by Attribute Grammars", retrieved at <<http://delivery.acm.org/10.1145/960000/958251/p171-ganacarski.pdf?key1=958251&key2=1953056511&coll=GUIDE&dl=GUIDE&CFID=938840&CFTOKEN=86422764>>, DocEng 03, Nov. 20-22, 2003, ACM, 2006, pp. 171-174.

(Continued)

*Primary Examiner*—Laurie Ries

(57) ABSTRACT

Various embodiments can provide a tool aimed at identifying document conditions that can lead to processing bottlenecks when an associated document is consumed, such as by being rendered or printed, by a particular device. In at least some embodiments, the tool can identify or diagnose such conditions and report those conditions to an appropriate entity, such as a device that produced the associated document and/or an individual who caused the document to be produced. The reporting functionality may include, in at least some embodiments, remedial recommendations aimed at mitigating the diagnosed conditions.

20 Claims, 5 Drawing Sheets

U.S. PATENT DOCUMENTS

2008/0115055 A1 * 5/2008 Sadovsky et al. ........... 715/255

OTHER PUBLICATIONS

Lovegrove, et al., “Document Analysis of PDF Files: Methods, Results and Implications”, retrieved at <<http://eprint.nottingham.ac.uk/archive/00000300/01/stasis.pdf>>, John wiley & Sons, Ltd., Electronic Publishing, vol. 8 (2&3), Jun. & Sep. 1995, pp. 207-220.

Pierron et al., “An XML/SVG Platform for Document Analysis”, retrieved at http://www.science.uva.nl/events/dlia2001/program/s13_DL05.pdf#search=%22text%20document%20format%20analysis%20application%22>>, INRIA-LORIA, Campus Scientifique BP, France, pp. 04.

“Test Strategies for XPS Consumers”, retrieved on Aug. 28, 2006, at <<http://dlownload.microsoft.com/download/a/f/7/af7777e5-7dcd-4800-8a0a-b18336565f5b/QLI_WinHec06.doc>>, Quality logic Inc., May 11, 2006.

* cited by examiner

DOCUMENT PERFORMANCE ANALYSIS

BACKGROUND

Many times applications and other components, such as print filters, can emit documents which, while generally conformant to a pertinent specification or standard, fail to conform in a desirably efficient manner. For example, while a particular document file or stream may satisfy pertinent requirements or constraints of the specification or standard relative to which it was produced, the produced file or stream may not reflect the best arrangement or structure so as to mitigate processing concerns when the file or stream is rendered.

SUMMARY

Various embodiments can provide a tool aimed at identifying document conditions that can lead to processing bottlenecks when an associated document is consumed, such as by being rendered or printed, by a particular device or software application In at least some embodiments, the tool can identify or diagnose such conditions and report those conditions to an appropriate entity, such as a device that produced the associated document and/or an individual who caused the document to be produced. The reporting functionality may include, in at least some embodiments, remedial recommendations aimed at mitigating the diagnosed conditions. In at least some embodiments, document conditions that can lead to bottlenecks can be considered as falling into two categories—file or stream size conditions and rendering/consumption conditions. Within each of these two categories, one or more diagnostic checks can be performed each of which can address different document parameters.

DETAILED DESCRIPTION

Overview

Various embodiments can provide a tool aimed at identifying document conditions that can lead to processing bottlenecks when an associated document is consumed, such as by being rendered or printed, by a particular device. In at least some embodiments, the tool can identify or diagnose such conditions and report those conditions to an appropriate entity, such as a device that produced the associated document and/or an individual who caused the document to be produced.

The reporting functionality may include, in at least some embodiments, remedial recommendations aimed at mitigating the diagnosed conditions. In at least some embodiments, document conditions that can lead to bottlenecks can be considered as falling into two categories—file or stream size conditions and rendering/consumption conditions. Within each of these two categories, one or more diagnostic checks can be performed each of which can address different document parameters.

In the discussion that follows, a section entitled "Performance Analysis" is provided and introduces the general notion of document analysis and various exemplary parameters that can be checked when or after a document is produced. Following this, a section entitled "Implementation Example" is provided and describes how various principles described in the previous section can be employed in the context of a tangible document specification. It is to be appreciated and understood that the principles described in this document are not to be limited to the specific implementation that is described. Rather, the principles can be employed with other document specifications and technologies without departing from the spirit and scope of the claimed subject matter.

Performance Analysis

Figure 1:
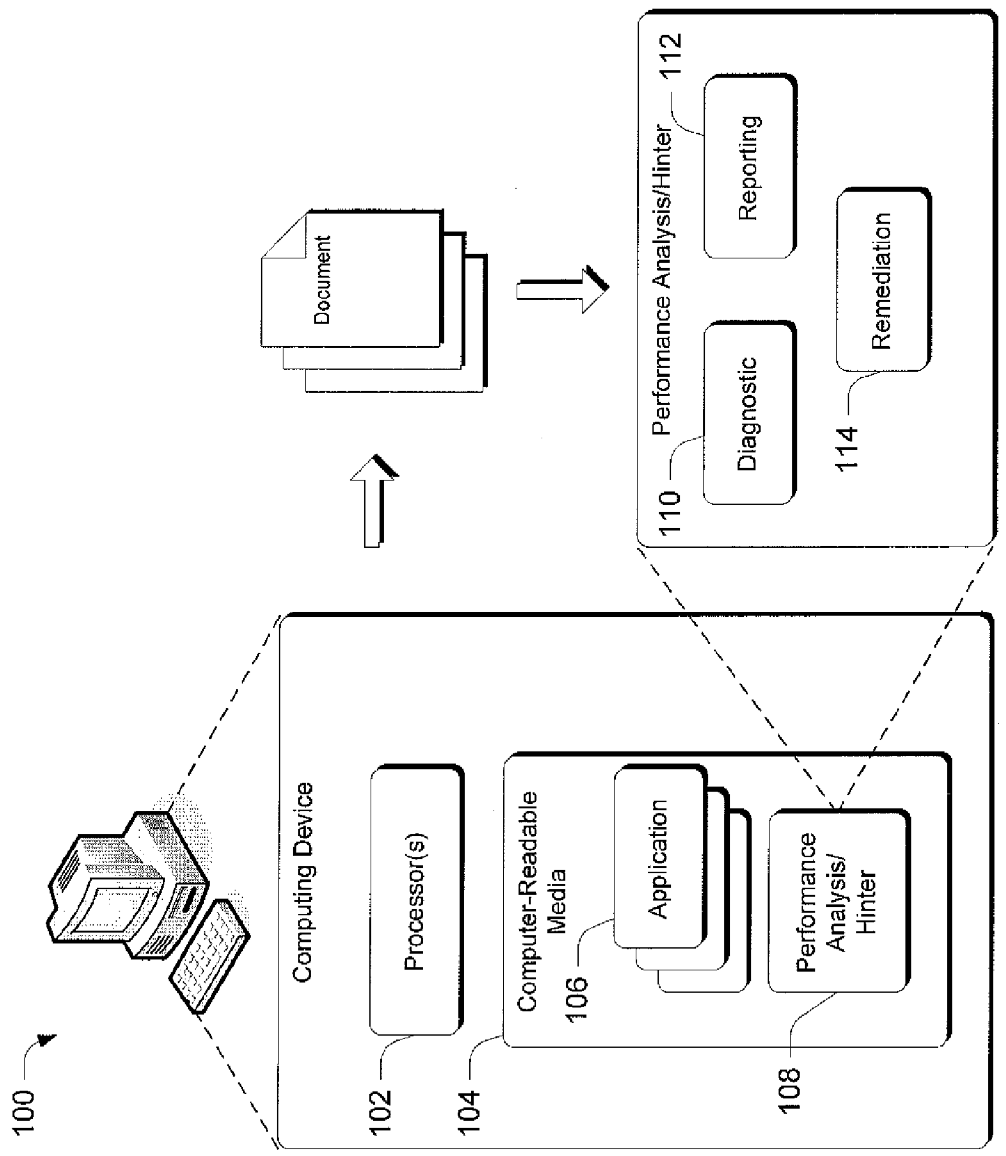
FIG. 1 illustrates an exemplary system in accordance with one embodiment.

FIG. 1 shows an exemplary system in accordance with one embodiment generally at 100. Here, system 100 includes a computing device which, in turn, includes one or more processors 102 and one or more computer-readable media 104 which can include any suitable type of computer-readable media such as, by way of example and not limitation, ROM, RAM, hard disk, magnetic or optical media, flash memory and the like. Embodied on the computer-readable media 104 are one or more applications 106 that are executable by the processor(s) to produce various documents. Any suitable applications can be employed such as, by way of example and not limitation, word processing applications, spreadsheet applications, email applications, vertical graphics-intensive application such as CAD systems, archival software suites such as document repositories, file format converters and the like.

Also embodied on the computer-readable media is a performance analysis/hinter component 108, hereinafter referred to as an "analyzer" or "document analyzer". In accordance with one or more embodiments, analyzer 108 includes one or more of the following functionalities—a diagnostic component 110, a reporting component 112 and/or a so-called remediation component 114. Although these components are shown as logically separate, it is to be appreciated and understood that such is done for discussion purposes. Accordingly, such functionality may be embodied in an integrated component.

In practice, when an application creates or produces a document, it typically does so in association with a set of rules, such as those that might be prescribed by a particular specification or standard. Thus, a user operating the illustrated computing device may cause a document to be produced. In accordance with one or more embodiments, when a document is created, or thereafter at an appropriate time, the document is analyzed by analyzer 108 in an attempt to identify document conditions that can lead to processing bottlenecks when the document is consumed, such as by being rendered or printed, by a particular device.

In this example, diagnostic component 110 receives the document or document container and begins to analyze the document to identify whether any of such conditions are present. The document conditions can comprise any suitable conditions examples of which are provided below. Typically, knowledge of the fact that a particular condition can lead to a processing bottleneck comes from the collective knowledge of those individuals who design and build document specifications or standards, or those who build and design document producers or consumers. Thus, over time, these individuals come to possess expertise and knowledge on the types of conditions that can lead to problematic bottleneck conditions. By knowing which conditions to look for, the diagnostic component 110 can be configured and, subsequently adapted or reconfigured to look for such conditions. Analysis of the document or document container can take place after the document has been assembled and/or while the document is being assembled or built.

Once a particular condition has been identified, reporting component 112 can report the presence of any such conditions to an appropriate entity. For example, such reporting may take place by programmatically reporting the conditions to a producing application or device. Alternately or additionally, such reporting may take place via a suitable user interface in which the presence of the condition can be reported to an individual, such as the individual who produced or is producing the document.

Further, in one or more embodiments, a remediation component 114 can be provided and can provide suggestions or recommendations designed to mitigate problematic conditions that have been identified. In at least some embodiments, such suggestions or recommendations may be provided programmatically to a producing application or device. Alternately or additionally, such suggestions or recommendations may be provided via a suitable user interface to an individual, such as the individual who produced or is producing the document. Alternately or additionally, the suggestions or recommendations may be automatically implemented or executed by the remediation component so that the document is placed into a more optimal or desirable format.

Having discussed the general notion of a document analyzer, consider now some exemplary problematic conditions for which the analyzer can look. As indicated above, in one or more embodiments, such conditions can be categorized into two categories—file or stream size conditions and rendering/consumption conditions, both of which can affect performance issues associated with the document. Within each of these two categories, one or more diagnostic checks can be performed each of which can address different document parameters. Each of these categories is separately discussed below under its own respective heading. It is to be appreciated and understood, however, that such categorization of conditions is not to be used to limit application of the claimed subject matter to only these conditions or categories. Rather, other categories and/or conditions can be utilized without departing from the spirit and scope of the claimed subject matter.

File or Stream Size Conditions

Many times the size of a particular document file or stream will directly affect the processing performance associated with the particular document. This processing performance can occur both on the production side (e.g. within the application producing the document) or on the consumption side (e.g. within the rendering device or software rendering the document).

Some of the conditions that can lead to undesirable file or stream sizes include, by way of example and not limitation, whether the file or stream has multiple redundant content, such as images and the like, whether the file format is poorly constructed, and/or whether no compression or less than desirable compression is being used on the document.

Specific examples of these conditions are described below following the section entitled "Implementation Example".

Rendering/Consumption Conditions

Most often, the state or condition of a document file or stream will directly affect the processing performance associated with rendering the particular document. In accordance with one or more embodiments, a document can be analyzed for conditions that can lead to less than desirable rendering situations. Some of the conditions that can lead to less than desirable document rendering can include, by way of example and not limitation, whether a document format is poorly constructed so as to adversely impact a document consumer's parsing functionality, using sub-optimal or undesirable document formatting which, while satisfying the relevant specification or standard, is still not an efficient format, and/or whether the document format has underutilized or not utilized more efficient document formatting techniques.

Specific examples of these conditions are described below following the section entitled "Implementation Example".

Implementation Example

In accordance with one or more embodiments, the above- and below-described techniques and tools can be employed in connection with documents that conform to the XML Paper Specification (XPS) version 0.95, available from Microsoft Corporation.

As background, XPS describes a set of conventions for the use of XML and other widely available technologies to describe the content and appearance of paginated documents. It is written for developers who build systems that process XPS content. One goal of XPS is to ensure the interoperability of independently created software and hardware systems that produce or consume XPS content. The XPS specification defines the formal requirements that producers and consumers satisfy in order to achieve interoperability.

In the description below, a paginated-document format called the XPS Document is described. The format requirements are an extension of the packaging requirements described in the Open Packaging Conventions (OPC) specification. That specification describes packaging and physical format conventions for the use of XML, Unicode, ZIP, and other technologies and specifications to organize the content and resources that make up any document. OPC is an integral part of the XPS specification.

In the discussion below, certain high level aspects of XPS are described for the purpose of providing at least some context of how the above-described principles can be employed in a tangible context. For a detailed treatment of XPS, the reader is referred to the specification referenced above.

XPS Document Format

The XPS specification describes how the XPS Document format is organized internally and rendered externally. It is built upon the principles described in the Open Packaging Conventions specification. The XPS Document format represents a set of related pages with a fixed layout, which are organized as one or more documents, in the traditional meaning of the word. A file that implements this format includes everything necessary to fully render those documents on a display device or physical medium (for example, paper). This includes all resources such as fonts and images that might be required to render individual page markings.

In addition, the format includes optional components that build on the minimal set of components required to render a set of pages. This includes the ability to specify print job control instructions, to organize the minimal page markings into larger semantic blocks such as paragraphs, and to physically rearrange the contents of the format for easy consumption in a streaming manner, among others.

Finally, the XPS Document format implements the common package features specified by the Open Packaging Conventions specification that support digital signatures and core properties.

Figure 2:
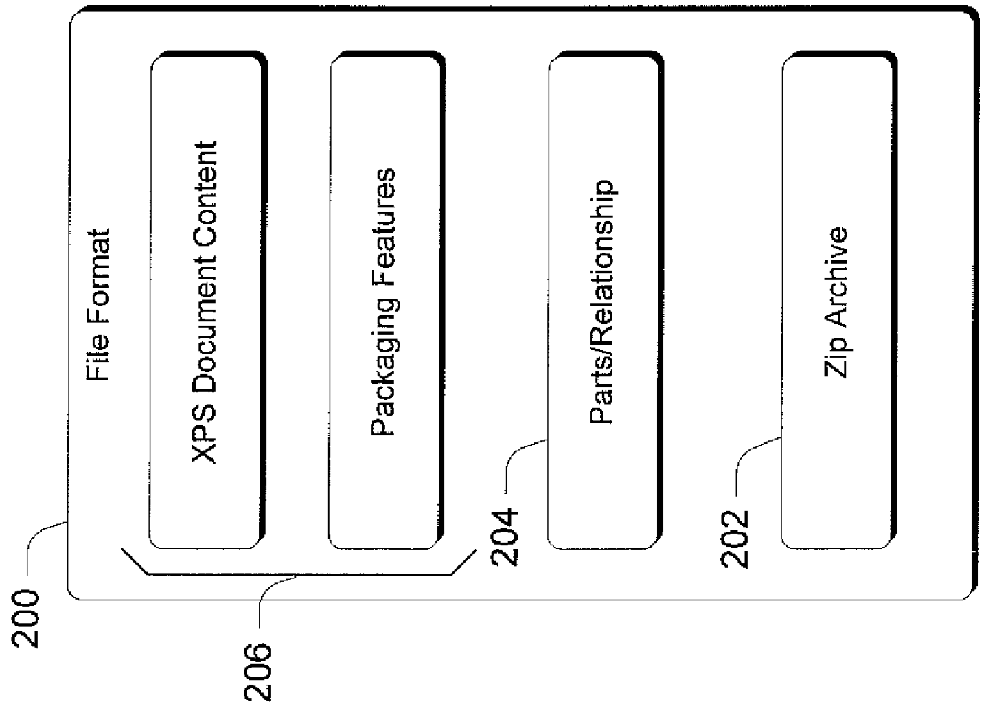
FIG. 2 illustrates an exemplary XPS Document format in accordance with one embodiment.

The XPS Document format uses a ZIP archive for its physical model. The Open Packaging Conventions specification describes a packaging model, that is, how the package is represented internally with parts and relationships. An example of the XPS Document format is shown in FIG. 2 generally at 200. Format 200 includes a ZIP archive 202 which constitutes a physical representation level, a parts/relationships level 204 which constitutes a logical representation level, and a Packaging Features and XPS Document Content level 206 which constitutes the content representation level.

The specification for the ZIP archive is well-known and, for the sake of brevity, is not described in detail here.

Parts/Relationships

The packaging conventions described in the Open Packaging Conventions specification can be used to carry any payload. A payload is a complete collection of interdependent parts and relationships within a package. The XPS specification defines a particular payload that contains a static or "fixed-layout" representation of paginated content: the fixed payload.

A package that holds at least one fixed payload and follows the rules described in this specification is referred to as an XPS Document. Producers and consumers of XPS Documents can implement their own parsers and rendering engines based on this specification.

The XPS Document format includes a well-defined set of parts and relationships, each fulfilling a particular purpose in the document. The format also extends the package features, including digital signatures, thumbnails, and interleaving.

A payload that has a FixedDocumentSequence root part is known as a fixed payload. A fixed payload root is a FixedDocumentSequence part that references FixedDocument parts that, in turn, reference FixedPage parts. There can be more than one fixed payload in an XPS Document.

A specific relationship type is defined to identify the root of a fixed payload within an XPS Document: the XPS Document StartPart relationship. The primary fixed payload root is the FixedDocumentSequence part that is referenced by the XPS Document StartPart relationship. Consumers such as viewers or printers use the XPS Document StartPart relationship to find the primary fixed payload in a package. The XPS Document StartPart relationship must point to the FixedDocumentSequence part that identifies the root of the fixed payload.

The payload includes the full set of parts required for processing the FixedDocumentSequence part. All content to be rendered must be contained in the XPS Document. The parts that can be found in an XPS Document are listed in the table just below.

| Name | Description |
|---|---|
| FixedDocumentSequence | Specifies a sequence of fixed documents. |
| FixedDocument | Specifies a sequence of fixed pages. |
| FixedPage | Contains the description of the contents of a page. |
| Font | Contains an OpenType or TrueType font. |
| JPEG image<br>PNG image<br>TIFF image<br>Windows Media Photo image | References an image file. |
| Remote resource dictionary | Contains a resource dictionary for use by fixed page markup. |
| Thumbnail | Contains a small JPEG or PNG image that represents the contents of the page or package. |
| PrintTicket | Provides settings to be used when printing the package. |
| ICC profile | Contains an ICC Version 2 color profile optionally containing an embedded Windows Color System (WCS) color profile. |
| DocumentStructure | Contains the document outline and document contents (story definitions) for the XPS Document. |
| StoryFragments | Contains document content structure for a fixed page. |
| SignatureDefinitions | Contains a list of digital signature spots and signature requirements. |
| DiscardControl | Contains a list of resources that are safe for consumers to discard during processing. |

Figure 3:
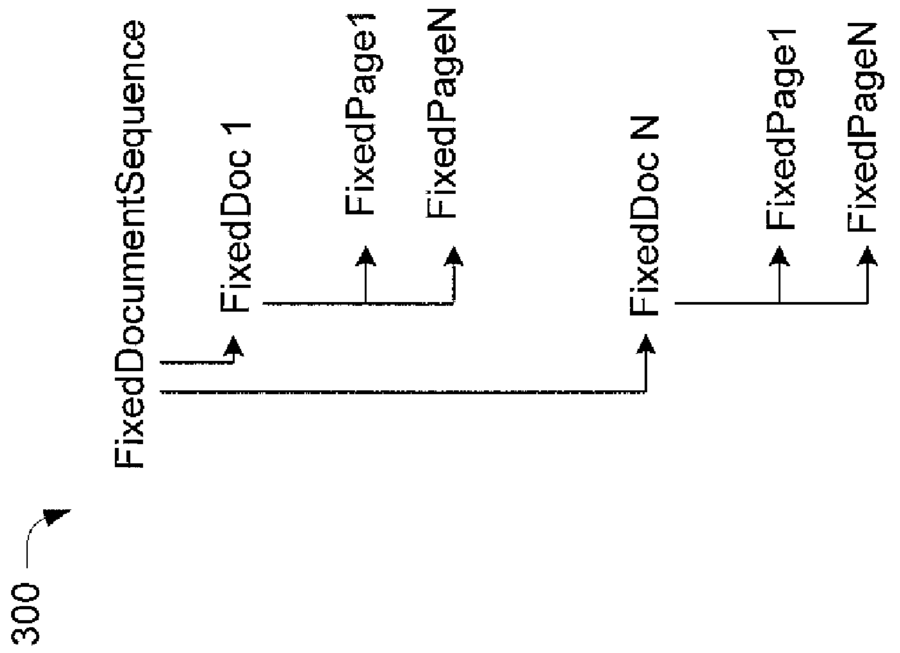
FIG. 3 illustrates an exemplary logical representation of an XPS document in accordance with one embodiment.

FIG. 3 illustrates an exemplary logical representation of an XPS document generally at 300.

The FixedDocumentSequence part assembles a set of fixed documents within the fixed payload. For example, a printing client can assemble two separate documents, a two-page cover memo and a twenty-page report (both are FixedDocument parts), into a single package to send to the printer.

The FixedDocumentSequence part is the only valid root of a fixed payload. Even if an XPS Document contains only a single fixed document, the FixedDocumentSequence part is still used. One FixedDocumentSequence part per fixed payload is required.

Fixed document sequence markup specifies each fixed document in the fixed payload in sequence, using <DocumentReference> elements. The order of <DocumentReference> elements determines document order and must be preserved by editing consumers. Each <DocumentReference> element should reference a FixedDocument part by relative URI.

The FixedDocument part is a common, easily indexed root for all pages within the document. A fixed document identifies the set of fixed pages for the document.

The markup in the FixedDocument part specifies the pages of a document in sequence using <PageContent> elements. The order of <PageContent> elements determines page order and must be preserved by editing consumers. Each <PageContent> element should reference a FixedPage part by relative URI.

The FixedPage part contains all of the visual elements to be rendered on a page. Each page has a fixed size and orientation. The layout of the visual elements on a page is determined by the fixed page markup. This applies to both graphics and text, which is represented with precise typographic placement. The contents of a page are described using a powerful but simple set of visual primitives.

Each FixedPage part specifies the contents of a page within a <FixedPage> element using <Path> and <Glyphs> elements (using various brush elements) and the <Canvas> grouping element. The <ImageBrush> and <Glyphs> elements (or their child or descendant elements) can reference Image parts or Font parts by URI. They should reference these parts by relative URI.

XPS Document markup is an XML-based markup language that uses elements, attributes, and namespaces. The schema for XPS Document markup includes only elements and their attributes, comments, and whitespace. Arbitrary character data intermingled in the markup is not allowed. Manipulations of the markup can comprise manipulating or corrupting elements, attributes, namespaces and the like.

Fixed page markup is expressed using elements and attributes and is based on a higher-level abstract model of contents and properties. Some fixed page elements can hold "contents," which are expressed as child elements. Properties may be expressed either as attributes or child elements.

XPS Document markup also uses resources and resource dictionaries, which allow elements to share property values.

With regard to the content representation of an XPS document, consider the following.

XPS Documents contain a root fixed document sequence that binds a collection of fixed documents which, in turn, bind a collection of fixed pages. All page markings are specified with <Glyphs> or <Path> elements on the fixed page. These elements can be grouped within one or more <Canvas> elements. Page markings are positioned by real-number coordinates in the coordinate space of the fixed page. The coordinate space can be altered by applying a render transformation.

The <FixedDocumentSequence> element contains one or more <DocumentReference> elements. The order of <DocumentReference> elements must match the order of the documents in the fixed document sequence.

The <DocumentReference> element specifies a FixedDocument part as a URI in the Source attribute. Producers must not produce a document with multiple <DocumentReference> elements that reference the same fixed document.

The <FixedDocument> element contains one or more <PageContent> elements. The order of <PageContent> elements must match the order of the pages in the document.

Each <PageContent> element refers to the source of the content for a single page. The number of pages in the document can be determined by counting the number of <PageContent> elements. The <PageContent> element has one allowable child element, <PageContent.LinkTargets>, and it must not contain more than a single child element. Producers must not produce markup where a <PageContent> element references the same fixed page referenced by any other <PageContent> element in the entire XPS Document, even in other fixed documents within the fixed payload.

The <PageContent.LinkTargets> element defines the list of link targets that specify each named element on the page that may be addressed by hyperlink.

The <LinkTarget> element specifies a Name attribute, which corresponds to a named location within the fixed page specified by its parent <PageContent> element. By encapsulating this information in the fixed document, consumers do not need to load every FixedPage part to determine if a particular Name value exists in the document.

The <FixedPage> element contains the contents of a page and is the root element of a FixedPage part. The fixed page contains the elements that together form the basis for all markings rendered on the page: <Paths>, <Glyphs>, and the optional <Canvas> grouping element.

The fixed page must specify a height, width, and default language. The coordinate space of the fixed page is composable, meaning that the marking effects of its child and descendant elements are affected by the coordinate space of the fixed page.

Additional markup elements of the XPS document and their descriptions can be found in the specification referenced above.

Having now described an exemplary document format specification, Now consider a document analyzer in the context of XPS documents.

XPS Performance Analysis

Figure 4:
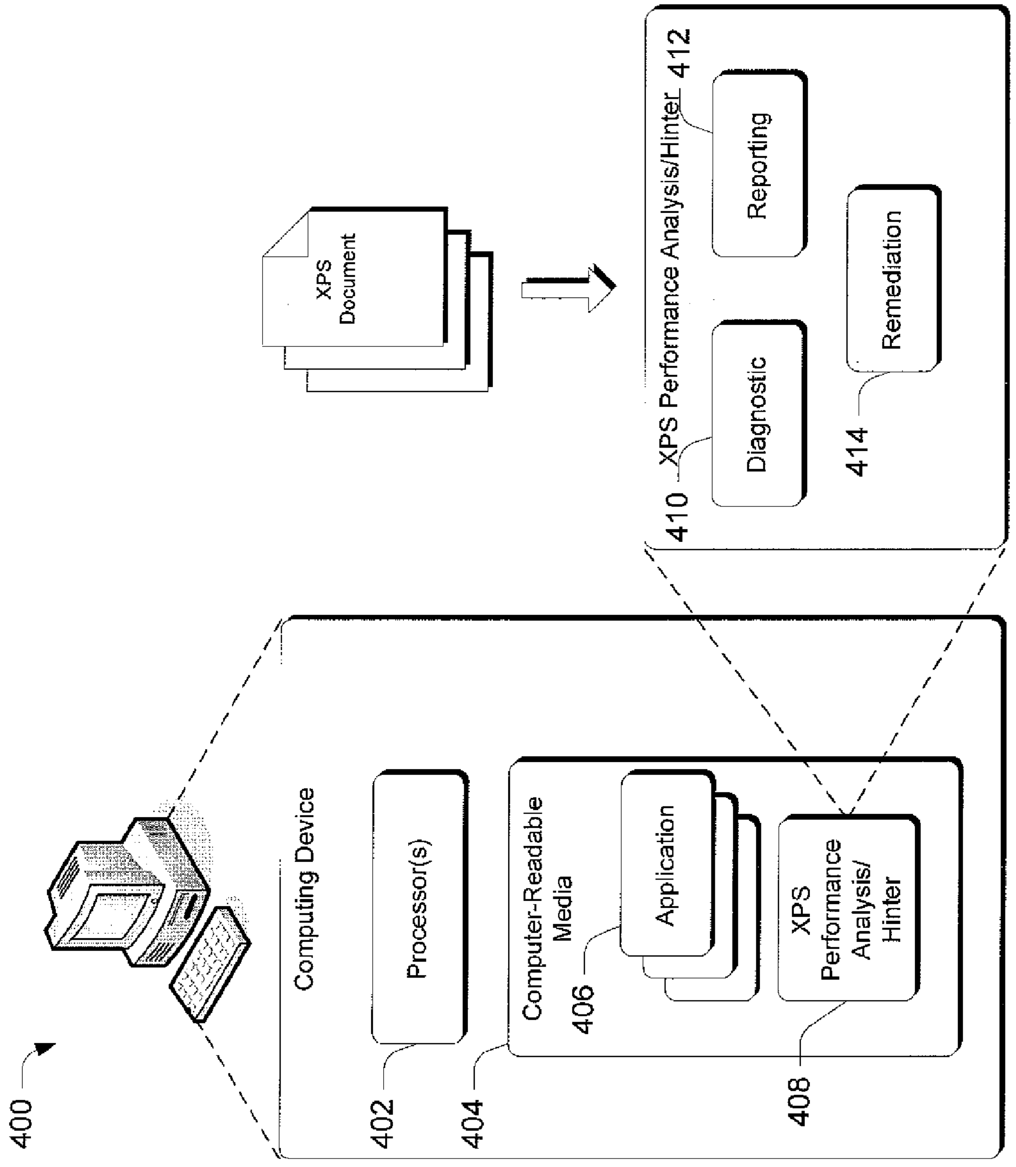
FIG. 4 illustrates an exemplary system in accordance with one embodiment.

FIG. 4 shows an exemplary system in accordance with one embodiment generally at 400. Here, system 400 includes a computing device which, in turn, includes one or more processors 402 and one or more computer-readable media 404 which can include any suitable type of computer-readable media such as, by way of example and not limitation, ROM, RAM, hard disk, magnetic or optical media, flash memory and the like. Embodied on the computer-readable media 404 are one or more applications 406 that are executable by the processor(s) to produce various documents. Any suitable applications can be employed such as, by way of example and not limitation, word processing applications, spreadsheet applications, email applications and the like.

Also embodied on the computer-readable media is an XPS performance analysis/hinter component 408, hereinafter referred to as an "XPS analyzer" or "XPS document analyzer". In accordance with one or more embodiments, XPS analyzer 408 includes one or more of the following functionalities—a diagnostic component 410, a reporting component 412 and/or a so-called remediation component 414. Although these components are shown as logically separate, it is to be appreciated and understood that such is done for discussion purposes. Accordingly, such functionality may be embodied in an integrated component.

In practice, when an application creates or produces an XPS document, it does so in association with the XPS specification, aspects of which are described above. Thus, a user operating the illustrated computing device may cause a document to be produced. In accordance with one or more embodiments, when a document is created, or thereafter at an appropriate time, the document is analyzed by analyzer 408 in an attempt to identify document conditions that can lead to processing bottlenecks when the document is consumed, such as by being rendered or printed, by a particular device.

In this example, diagnostic component 410 receives the document or document container and begins to analyze the document to identify whether any of such conditions are present. The document conditions can comprise any suitable conditions examples of which are provided below. As described above, diagnostic component 410 can be configured and, subsequently adapted or reconfigured to look for such conditions. Analysis of the document or document container can take place after the document has been assembled and/or while the document is being assembled or built.

Once a particular condition has been identified, reporting component 412 can report the presence of any such conditions to an appropriate entity. For example, such reporting may take place by programmatically reporting the conditions to a producing application or device. Alternately or additionally, such reporting may take place via a suitable user interface in which the presence of the condition can be reported to an individual, such as the individual who produced or is producing the document.

Further, in one or more embodiments, a remediation component 414 can be provided and can provide suggestions or recommendations designed to mitigate problematic conditions that have been identified. In at least some embodiments, such suggestions or recommendations may be provided programmatically to a producing application or device. Alternately or additionally, such suggestions or recommendations may be provided via a suitable user interface to an individual, such as the individual who produced or is producing the document. Alternately or additionally, the suggestions or recommendations may be automatically implemented or executed by the remediation component so that the document is placed into a more optimal or desirable format.

Having discussed the general notion of an XPS document analyzer, consider now some exemplary problematic conditions for which the XPS analyzer can look. As indicated above, in one or more embodiments, such conditions can be categorized into two categories—file or stream size conditions and rendering/consumption conditions, both of which can affect performance issues associated with the document. Within each of these two categories, one or more diagnostic checks can be performed each of which can address different document parameters. Each of these categories is separately discussed below under its own respective heading. It is to be appreciated and understood, however, that such categorization of conditions is not to be used to limit application of the claimed subject matter to only these conditions or categories. Rather, other categories and/or conditions can be utilized without departing from the spirit and scope of the claimed subject matter.

File or Stream Size Conditions

Many times the size of a particular XPS document file or stream will directly affect the processing performance associated with the particular document. This processing performance can occur both on the production side (e.g. within the application producing the document) or on the consumption side (e.g. within the rendering device or software rendering the document).

Some of the conditions that can lead to undesirable file or stream sizes include, by way of example and not limitation, whether the file or stream has multiple redundant content or resources, such as images and the like, whether the file format is poorly constructed, and/or whether no compression or less than desirable compression is being used on the document.

Redundant or Sub-Optimally Employed Resources

In one or more embodiments, document files and/or streams can be checked to ascertain whether redundant resources are utilized. Redundant resources can include, by way of example and not limitation, images. In at least some embodiments, once the images are identified, typically through the document markup or the relationship defined in the XPS file, the images can be compared as by performing a bit-by-bit binary comparison of the images. Alternately or additionally, the images can be decoded into a buffer, such as a 24 bit buffer, and then compared using CRCs or hashes of the images for comparison.

In at least some embodiments, different types of comparisons can be selected or utilized based on the characteristics of the collection of images being compared. For example, in at least some instances the size and number of images can be a determining factor in establishing relevant thresholds that define how the images are to be compared.

In at least some embodiments, if redundant resources are found, the XPS analyzer can report this fact, as mentioned above. Alternately or additionally, the XPS analyzer can implement remedial measures to include only one of the resources, replacing the other resources with references or links to the included resource.

In addition to checking for redundant resources, the XPS analyzer can perform a check to ascertain whether any of the images are poorly compressed.

For example, many times TIFF files are not compressed; however, in many instances there is no need for TIFF files not to be compressed. In cases such as this and others, if there are uncompressed TIFF files, then lossless compression techniques can be used or at least recommended.

In addition, in some instances a compression algorithm might have been utilized to compress a portion of the document. However, the compression algorithm might not have been the best selection. For example, a high resolution-type compression algorithm might have been used to compress a particular image or set of images. Yet, when one considers the characteristics or intended environment in which the images are to be used, a lower resolution-type algorithm might have been a better selection. For example, if the set of images was intended for thumbnail display or on a small form factor device, then a different compression algorithm might have been a better selection. In this case, in at least some embodiments, the fact that a better compression algorithm is available can be reported as described above. Alternately or additionally, the images might be automatically reprocessed to utilize the better compression algorithm.

One of the checks for redundant resources can include checking to ascertain whether fonts have been properly subsetted or whether subsetting policies are suboptimal. More specifically, fonts that are utilized in XPS documents can be quite large. XPS documents represent text using the <Glyphs> element. Since the format is fixed, it is possible to create a font subset that contains only the glyphs required or utilized by the package. That is, fonts may be subsetted based on glyph usage. When a font is subsetted, it does not contain all the glyphs in the original font. Hence, economies can be gained by subsetting fonts. In one or more embodiments, the XPS analyzer can check to ascertain whether any fonts employed in an XPS document have been subsetted. If font subsetting has not been employed but could have been employed, then the XPS analyzer can report and/or remedy the situation.

In other cases, the XPS analyzer can check to ascertain whether font subsetting policies are suboptimal. For example, even if subsetting was used, there still may be too many fonts with identical glyphs on too many pages. In this case, an appropriate remedy would be to move the subsetted fonts into a resource dictionary and reference the resource dictionary instead of the individual fonts.

Poorly Constructed Markup

In one or more embodiments, the document markup content can be analyzed to ascertain whether it can be more efficiently represented in markup. As an example, consider the following. There are markup characteristics that can lead to sub-optimal or undesirable performance on the consumption end. For example, providing a linear gradient on every single page of a presentation may not be a desirably efficient way to represent the gradient due to the processing overhead associated with the gradient. For example, the background of a presentation may include a linear gradient that transitions from one color to another very smoothly. However, instead of representing the presentation's linear gradient as such for each presentation slide, the linear gradient might be better represented as a line having particular properties which, if repeated over and over, provides a gradient approximation.

In this case, the XPS analyzer can analyze the document's markup and report and/or remedy inefficient or poorly constructed markup.

Undesirable Compression

In at least some embodiments, the XPS analyzer can ascertain whether the appropriate compression techniques have been utilized for the document package. More specifically, at the ZIP level, the XPS Specification allows for a good range of compression levels. For example, all of the files of a document can be compressed into a ZIP file using very large compression. While this approach takes a great deal of compression time, the result is a small document package. On the other hand, no compression or very low compression might have been used. In some instances, it may be more beneficial to use no compression or very low compression rather than very large compression. For example, if a document is intended for consumption on a resource-constrained consumer, then a lesser amount of compression might be utilized to alleviate the resource-constrained consumer's processing overhead.

Rendering/Consumption Conditions

Most often, the state or condition of an XPS document file or stream will directly affect the processing performance associated with rendering the particular document. In accordance with one or more embodiments, a document can be analyzed for conditions that can lead to less than desirable rendering situations. Some of the conditions that can lead to less than desirable document rendering can include, by way of example and not limitation, whether a document format is poorly constructed so as to adversely impact a document consumer's parsing functionality, using sub-optimal or undesirable document formatting which, while satisfying the relevant specification or standard, is still not an efficient format, and/or whether the document format has underutilized or not utilized more efficient document formatting techniques.

Markup Affecting Consumer Parsing

Poorly constructed markup can cause consumers to spend more time in parsing and/or rendering than is desirable. That is, while the markup may satisfy the XPS specification, the markup may be such that the actual rendering may be adversely impacted, e.g. consider the radial gradient brush.

In addition, poorly constructed markup may describe many layered semi-transparent objects which can cause consumers to spend more time parsing the markup than is desirable.

In addition, markup that describes complex clipping operations can cause consumers to spend more time parsing than is desirable.

Suboptimal Document Interleaving

Interleaving concerns the physical organization of XPS documents, rather than their logical structure. Interleaving allows consumers to linearly process the bytes that make up a physical package from start to finish, without regard for context. In other words, consumers can make correct determinations about the types of logical parts and the presence of relationships on a logical part when consuming packages in a linear fashion. Consumers are not required to return to previously encountered parts and revise their determination of the content type or presence of relationships.

In one or more embodiments, the XPS analyzer can check to ensure that interleaved document portions are sent in the correct order. That is, the document producer may have interleaved the document in a sub-optimal or undesirable way. Hence, the XPS analyzer can check to ensure that interleaving is correct and desirable. If it is not, then the XPS analyzer can report this and/or remedy it.

In at least some embodiments, the XPS analyzer may ascertain that the file or document is not interleaved at all. In this case, the XPS analyzer may recommend that it be interleaved. For example, while not interleaved, the file may be in an appropriate format for viewing, but in a marginal format for printing. Here, the XPS analyzer might suggest that interleaving be employed.

Missing or Inefficient Use of Various Controls

In one or more embodiments, the XPS analyzer can ascertain whether a document or document package has efficiently employed various controls. As an example, consider the following. XPS allows for the use of a DiscardControl part. The DiscardControl part contains a list of resources that are safe for the consumer to discard. DiscardControl parts are stored in XPS Documents in an interleaved fashion, allowing a resource-constrained consumer to discard a part as soon as it appears in the DiscardControl part.

In some instances, if a DiscardControl part is not used, then resource-constrained consumers (and others) will have to necessarily retain a part longer than necessary. In these instances, the XPS analyzer can analyze a document to ascertain whether any parts should appear in a list of resources contained by the DiscardControl part. If so, the XPS analyzer can report and/or remedy the situation.

Images Too Heavily Banded

In some instances, images are banded which means that the images consist of individual bands, each of which makes up a portion of the image. There may be instances, however, where particular images are too densely banded. In this case, the XPS analyzer can report this and/or remedy the situation. In one or more embodiments, remediation can be done by combining (e.g., "image stitching") the heavily banded images. This remediation may, in some instances, have side effects, in which case it may be implemented as a report-only feature to denote the suboptimal production of the XPS file.

Suboptimal Use of Opacity or Opacity Masks

Opacity masks are designed to be used to represent various levels of opacity in an image. Typically, in the XPS space, an opacity mask with a value of 0 is transparent and not seen, and an opacity mask with a value of 1 is fully opaque, with values therebetween defining various levels of transparency. There are characteristics of images relative to their opacity masks which can make it such that an opacity mask is not needed. For example, if the image is completely visible or not seen at all, then the image does not need an opacity mask. Yet, by including an opacity mask with such an image, processing on the consuming end needlessly complicated.

Accordingly, the XPS analyzer can looks for such instances and report and/or remedy them. For example, it is generally inconvenient for print devices to render graphics that contain transparencies because such requires a significant portion of the frame buffer (page content, in other words) to be resident in device memory—and device memory is a limited resource. Remediation can include flattening the transparencies into raster, as will be appreciated by the skilled artisan.

Objects Below Opaque Objects in Z-Ordering Hierarchy

In at least some embodiments, a document may include objects that lie below opaque objects in the z-ordering hierarchy. In these instances, since the object will not be seen, there is no need to include it and it can be removed.

Accordingly, the XPS analyzer can analyze a document and look for instances such as these and report and/or remedy the situation, as by removing the object or references thereto.

Rasterization Versus Vector Graphics

Sometimes the rendering time associated with vector graphics is longer than desirable. In at least some instances, it may be more desirable to represent renderable content using rasterization rather than vector graphics. Such can be the case, for example, in instances where linear gradients, radial gradients and markup with too many stop points are used.

Accordingly, in at least some embodiments, the XPS analyzer can analyze a document and look for situations where rasterization might provide a better alternative than vector graphics. In instances such as these, the XPS analyzer can report and/or remedy the situation.

Exemplary Method

Figure 5:
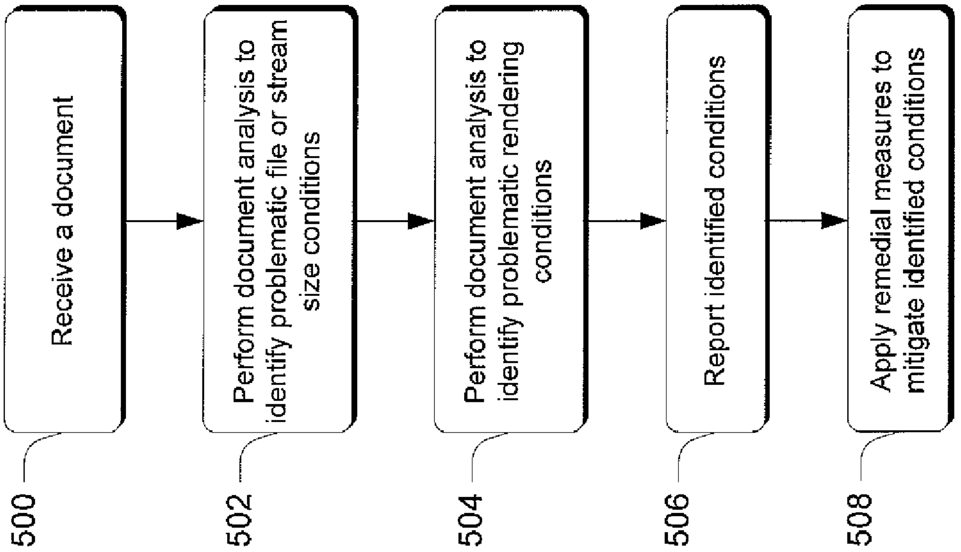
FIG. 5 is a flow diagram that describes steps in a method in accordance with one embodiment.

FIG. 5 is a flow diagram that describes steps in a method in accordance with one embodiment. The method can be implemented in connection with any suitable hardware, software, firmware or combination thereof. In at least some embodiments, the method can be implemented by a software component in the form of a document analyzer. In at least some embodiments, this software component can reside in the form of an XPS document analyzer.

Step 500 receives a document. This step can be performed in any suitable way. For example, this step can be performed during the time when a document is being built. Specifically, a user, executing document-building software, can build a document. As the document is being built and formatted, portions of the document can be received and processed as described below. Alternately or additionally, once a document is entirely built, it can be received and processed as described below.

Step 502 performs document analysis to identify problematic file or stream size conditions. Examples of how this can be done and various types of problematic conditions are given above. Step 504 performs document analysis to identify problematic rendering conditions. Examples of how this can be done and various problematic conditions are given above.

Step 506 reports one or more identified conditions. This step can be performed in any suitable way. For example, in one or more embodiments, this step can be performed by reporting the condition(s) to a user via a suitably configured user interface. Alternately or additionally, this step can be performed by reporting the conditions(s) to appropriately configured software or to the device that is being used to create the document.

Step 508 applies one or more remedial measures to mitigate identified conditions. Any suitable remedial measures can be applied in any suitable way. For example, a remedial measure can be applied responsive to receiving user input to apply the measure. In this example, a user might have previously been informed that a particular document condition exists. Responsively, the user can then take steps to mitigate the condition. Alternately or additionally, the remedial measure(s) can be automatically applied, as by a suitably configured component, such as a document analyzer.

It is to be appreciated and understood that the above-described method can be employed with any suitable type of document. One specific type of document is an XPS document. Other documents can be utilized without departing from the spirit and scope of the claimed subject matter.

CONCLUSION

Various embodiments can provide a tool aimed at identifying document conditions that can lead to processing bottlenecks when an associated document is consumed, such as by being rendered or printed, by a particular device. In at least some embodiments, the tool can identify or diagnose such conditions and report those conditions to an appropriate entity, such as a device that produced the associated document and/or an individual who caused the document to be produced. The reporting functionality may include, in at least some embodiments, remedial recommendations aimed at mitigating the diagnosed conditions.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:

one or more computer-readable media;

computer-readable instructions on the one or more computer-readable media which, when executed, implement a document analyzer comprising:

a diagnostic component configured to receive and analyze a document to ascertain whether one or more problematic document conditions exist that can affect processing performance of the document when the document is rendered or consumed, wherein the diagnostic component is configured to analyze for problematic conditions associated with a document's file or stream size, and conditions associated with rendering or consuming the document; and a reporting component associated with the diagnostic component and configured to report one or more problematic document conditions that can affect processing performance of the document when the document is rendered or consumed ascertained by the diagnostic component.

2. The system of claim 1 further comprising a remediation component configured to provide suggestions or recommendations designed to mitigate problematic conditions that have been identified.

3. The system of claim 1, wherein one of the problematic conditions for which the diagnostic component analyzes is associated with whether a document includes multiple redundant content.

4. The system of claim 1, wherein one of the problematic conditions for which the diagnostic component analyzes is associated with document format construction.

5. The system of claim 1, wherein one of the problematic conditions for which the diagnostic component analyzes is associated with compression, if any, that was used to compress the document.

6. The system of claim 1, wherein said document analyzer is configured to analyze documents that conform to the XML Paper Specification (XPS).

7. The system of claim 1, wherein said document analyzer is configured to analyze documents that conform to a specification that uses XML to describe the content and appearance of a document.

8. A system comprising:

one or more computer-readable media;

computer-readable instructions on the one or more computer-readable media which, when executed, implement a document analyzer configured to analyze documents that conform to the XML Paper Specification (XPS), the document analyzer comprising:

a diagnostic component configured to receive and analyze a document to ascertain whether one or more problematic document conditions exist that can affect processing performance of the document when the document is rendered or consumed; and a reporting component associated with the diagnostic component and configured to report one or more problematic document conditions that can affect processing performance of the document when the document is rendered or consumed ascertained by the diagnostic component.

9. The system of claim 8 further comprising a remediation component configured to provide suggestions or recommendations designed to mitigate problematic conditions that have been identified.

10. The system of claim 8, wherein the one or more problematic document conditions pertain to an XPS document's file or stream size.

11. The system of claim 8, wherein the one or more problematic document conditions pertain to conditions that adversely affect rendering or consumption of the XPS document.

12. The system of claim 11, wherein at least one of said one or more problematic conditions pertains to an XPS document's markup.

13. The system of claim 11, wherein at least one of said one or more problematic conditions pertains to an XPS document's interleaving or lack thereof.

14. The system of claim 11, wherein at least one of said one or more problematic conditions pertains to missing or inefficient use of controls.

15. The system of claim 8, wherein at least one problematic document condition pertains to whether a document utilizes redundant resources.

16. The system of claim 8, wherein at least one problematic document condition pertains to whether or how images within the document are compressed.

17. The system of claim 8, wherein at least one problematic document condition pertains font subsetting.

18. A computer-implemented method comprising:

receiving a document at a computer;

performing document analysis to identify problematic document file or stream size conditions that can affect processing performance of the document;

performing document analysis to identify problematic document rendering conditions that can affect processing performance of the document when the document is rendered or consumed; and reporting one or more identified problematic document file or stream size conditions or one or more identified problematic document rendering conditions.

19. The method of claim 18 further comprising applying one or more remedial measures to mitigate identified conditions.

20. The method of claim 18, wherein the act of receiving a document is performed by receiving an XPS document.

* * * * *

UNITED STATES PATENT AND TRADEMARK OFFICE

CERTIFICATE OF CORRECTION

PATENT NO. : 7,761,783 B2
APPLICATION NO. : 11/624897
DATED : July 20, 2010
INVENTOR(S) : Aaron Lahman et al.

It is certified that error appears in the above-identified patent and that said Letters Patent is hereby corrected as shown below:

In column 12, line 25, after "end" insert -- is --.

Signed and Sealed this
Third Day of May, 2011

David J. Kappos
*Director of the United States Patent and Trademark Office*